Sept. 1, 1925.

C. D. MILLER ET AL 1,552,332

AIR DEFLECTOR

Filed Sept. 2, 1924

Inventors
LEO M. HARVEY
CHESTER D. MILLER.

By Lyon & Lyon
Attorneys

Patented Sept. 1, 1925.

1,552,332

UNITED STATES PATENT OFFICE.

CHESTER D. MILLER AND LEO M. HARVEY, OF LOS ANGELES, CALIFORNIA.

AIR DEFLECTOR.

Application filed September 2, 1924. Serial No. 735,311.

*To all whom it may concern:*

Be it known that we, CHESTER D. MILLER and LEO M. HARVEY, citizens of the United States, residing at Los Angeles, in the county of Los Angeles and State of California, have invented a new and useful Air Deflector, of which the following is a specification.

This invention relates to air deflectors of the type employed on the sides of automobiles to deflect air current away from the sides of the automobile and thus protect the occupants thereof from strong drafts. More particularly the invention relates to air deflectors of a type suitable for installing on the doors of closed cars.

An object of the invention is to provide an air deflector of this type of comparatively simple and durable construction.

An important object is to provide a suitable mounting for the glass, whereby the glass may be firmly held.

The accompanying drawings illustrate the invention:

Figure 2:
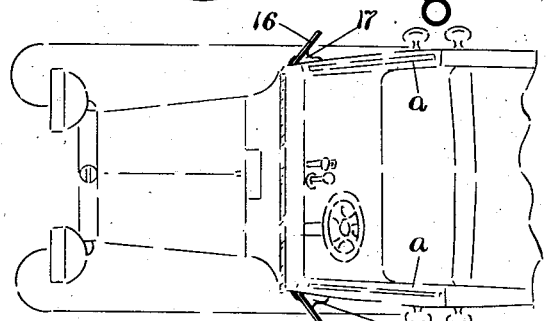
Fig. 2 is a plan view of the left half of Fig. 1, the roof being omitted so as to clearly expose the air deflectors.
Figure 4:
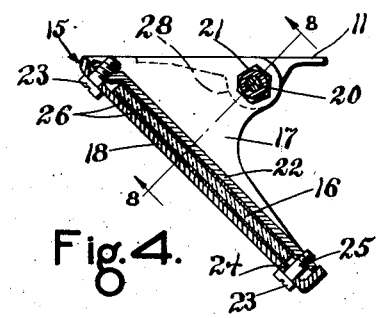
Fig. 4 is a plan section of the air deflector on the line indicated by 4—4, Fig. 3.
Figure 5:
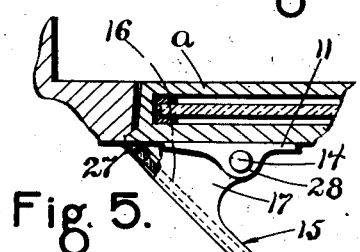
Fig. 5 is a plan view, partly in section, of the air deflector in place on the side of the automobile, a fragment of which is shown in section.

Fig. 2 of the drawings shows two of our new air deflectors mounted, one on each of the forward doors of an automobile. If desired, similar deflectors could also be mounted on the rear doors. The air deflectors on opposite sides of the car are of like construction and, therefore, only one of them will be described.

Suitable brackets 11 are secured by screws 12 to the door *a* of the automobile, one below the opening *b* in said door and the other above said opening. These brackets 11 have bearings 13 for pivots 14 which project from glass clamping members 15 at opposite ends of a pane of glass 16. The clamping members 15 are L-shape, each comprising a horizontal leg 17 and a vertical flange 18. The pivots 14 are headed studs extending through holes 19 in the leg 17 and threaded at 20 to receive nuts 21.

Besides the clamping members 15, another clamping member 22 is associated with each of the clamping members 15 to hold between them the pane of glass 16. The clamping members 22 are substantially of the same width as the flanges 18 and are drawn toward said flanges by screws 23 which enter through holes 24 in the flanges 18 and have threaded engagement with holes 25 in the clamping members 22. Interposed between the glass 16 and the clamping members 15, 22 are gaskets or cushions 26 of rubber or other suitable cushioning material. The forward edge of the glass 16 is provided with a buffer strip 27 of rubber or the like to prevent breaking of the glass 16 or marring of the side of the automobile.

Figure 6:
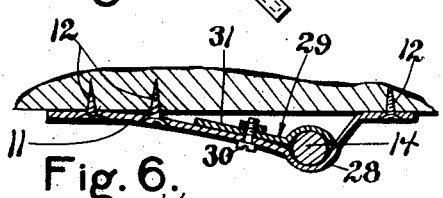
Fig. 6 is an enlarged plan section on the line indicated by 6—6, Fig. 3.
Figure 3:
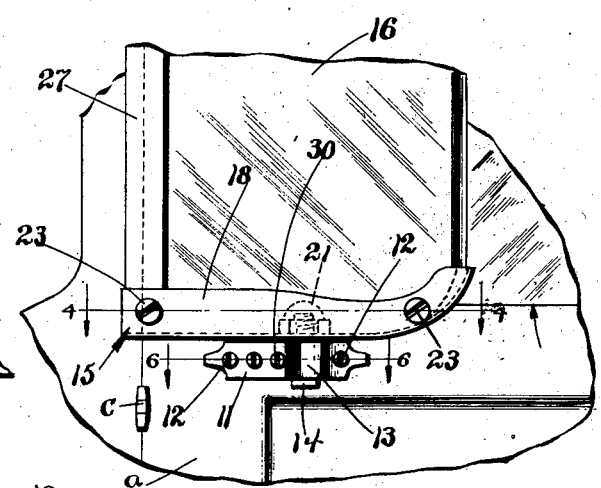
Fig. 3 is an enlarged side view of the lower portion of the air deflector and its lower mounting.
Figure 7:
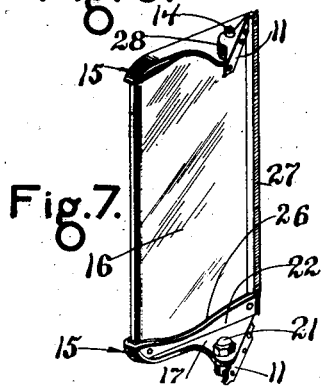
Fig. 7 is a perspective view of the air deflector looking at the inner face thereof.
Figure 8:
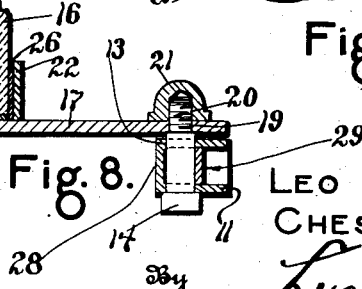
Fig. 8 is an enlarged sectional elevation on the line indicated by 8—8, Fig. 4.

The bearings 13 of the brackets 11 are split, as clearly shown in Fig. 6, the two halves 28, 29 being held together under tension by a bolt 30 which passes through a spring flange 31 of the bearing half 29. The pivots 14 are substantially midway of the length of the clamping members 15 so that said clamping members are firmly supported near their middle portions. Thus the mounting of the glass 16 is well balanced so that vibration transmitted to the deflector from the automobile will not affect it as much as would be the case if an unbalanced condition existed.

Figure 1:
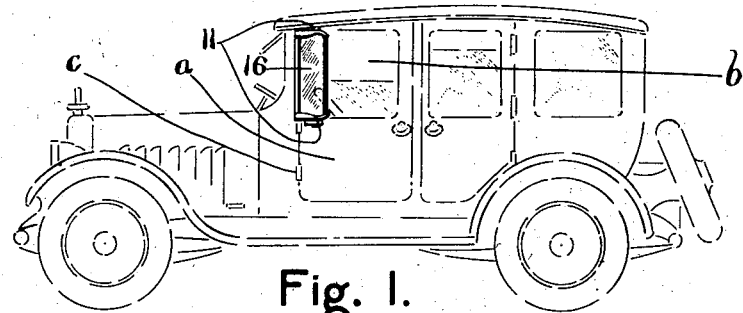
Fig. 1 is a side view of an automobile equipped with an air deflector constructed in accordance with the provisions of this invention.

The construction and operation of the air deflectors constructed in accordance with this invention will be apparent from the foregoing description and it will be seen that, when the deflectors are mounted in the manner shown in Figs. 1 and 2, the deflectors may be swung into position to bring their front edges quite close to the sides of the automobile and substantially in contact therewith and the deflectors extend aslant rearwardly and downwardly so that when the automobile is moving forward the air that strikes the deflectors is deflected outwardly away from the door openings *b*. When the doors are opened the air deflectors swing with them, the front edges of the deflectors being approximately alined with the axes of the hinges c of the doors a. Thus opening of the doors will not be interfered with by the deflectors and the positions to which the deflectors are adjusted relative to the doors will not be affected by opening and closing of said doors.

We claim:

1. An air deflector comprising brackets adapted for mounting on the outer face of an automobile door above and below the opening in said door and provided with bearings, clamping members having horizontally extending legs and vertical flanges, pivots projecting from the legs of the clamping members and engaging the bearings, other clamping members, a glass having its upper and lower edges interposed between the flanges and the second clamping members, and its front edge located so as to be positioned against the face of the door, or through said pivots to be adjusted to increase or diminish the space between said edge and the door, and means to draw the second clamping members toward the flanges.

2. An air deflector comprising brackets adapted for mounting on the outer face of an automobile door above and below the opening in the door and provided with bearings, clamping members having horizontally extending legs and vertical flanges, pivots projecting from the legs of the clamping members and engaging the bearings, cooperating clamping members, a glass having its upper and lower edges interposed between the flanges and the last-named clamping members and its front edge arranged to fit against the door or to be adjusted through said pivots so as to increase or diminish the space between said edge and the door and thus vary the amount of air admitted through said space to the opening in the door.

Signed at Los Angeles, California, this 26th day of August, 1924.

CHESTER D. MILLER.
LEO M. HARVEY.